United States Patent
Takeda et al.

(10) Patent No.: US 10,321,384 B2
(45) Date of Patent: Jun. 11, 2019

(54) USER DEVICE AND RESTRICTION METHOD

(71) Applicant: NTT DOCOMO, INC., Tokyo (JP)

(72) Inventors: Shinya Takeda, Tokyo (JP); Wuri Andarmawanti Hapsari, Tokyo (JP); Kenichiro Aoyagi, Tokyo (JP); Yasuharu Konishi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/557,829

(22) PCT Filed: Dec. 8, 2015

(86) PCT No.: PCT/JP2015/084412
§ 371 (c)(1),
(2) Date: Sep. 13, 2017

(87) PCT Pub. No.: WO2016/157628
PCT Pub. Date: Oct. 6, 2016

(65) Prior Publication Data
US 2018/0049103 A1    Feb. 15, 2018

(30) Foreign Application Priority Data
Apr. 3, 2015  (JP) .................................. 2015-077195

(51) Int. Cl.
*H04W 48/06*  (2009.01)
*H04W 48/16*  (2009.01)
*H04W 76/10*  (2018.01)

(52) U.S. Cl.
CPC ........... *H04W 48/06* (2013.01); *H04W 48/16* (2013.01); *H04W 76/10* (2018.02)

(58) Field of Classification Search
CPC ...... H04W 48/06; H04W 48/16; H04W 76/10
See application file for complete search history.

(56) References Cited

U.S. PATENT DOCUMENTS

| 9,585,054 B2 * | 2/2017 | Ahmad | H04W 28/0289 |
| 2012/0069739 A1 * | 3/2012 | Yabusaki | H04L 43/0888 |
| | | | 370/235 |

(Continued)

FOREIGN PATENT DOCUMENTS

WO    2014183254 A1    11/2014

OTHER PUBLICATIONS

International Search Report issued in PCT/JP2015/084412 dated Feb. 23, 2016 (3 pages).

(Continued)

*Primary Examiner* — Ajay Cattungal
(74) *Attorney, Agent, or Firm* — Osha Liang LLP

(57) ABSTRACT

A user device that communicates with a network apparatus and in which at least one application is installed. The user device includes a receiver that receives, from the network apparatus, restriction information including a destination identifier for identifying an external network connected to the network apparatus and a barring rate associated with the destination identifier, and a controller that when communication is to be started by the application, controls whether to allow or prevent the communication by the application based on the restriction information.

8 Claims, 7 Drawing Sheets

(56) References Cited

U.S. PATENT DOCUMENTS

| | | | | |
|---|---|---|---|---|
| 2015/0365516 A1* | 12/2015 | Aoyagi | ............ | H04M 1/72577 |
| | | | | 455/418 |
| 2016/0066259 A1* | 3/2016 | Guo | ..................... | H04W 76/10 |
| | | | | 370/230 |
| 2016/0165423 A1* | 6/2016 | Larsson | ................ | H04W 12/08 |
| | | | | 455/404.1 |

OTHER PUBLICATIONS

Written Opinion of the International Searching Authority issued in PCT/JP2015/084412 dated Feb. 23, 2016 (3 pages).

Intel Corporation; "An approach to ACDC work in CT1"; 3GPP TSG CT WG1 Meeting #88bis, C1-143547; Sophia Antipolis (France), Oct. 20-24, 2014 (5 pages).

3GPP TS 22.011 V13.1.0; "3rd Generation Partnership Project; Technical Specification Group Services and System Aspects; Service accessibility (Release 13)"; Sep. 2014 (27 pages).

Extended European Search Report issued in the counterpart European Patent Application No. 15887770.4, dated Aug. 1, 2018 (8 Pages).

* cited by examiner

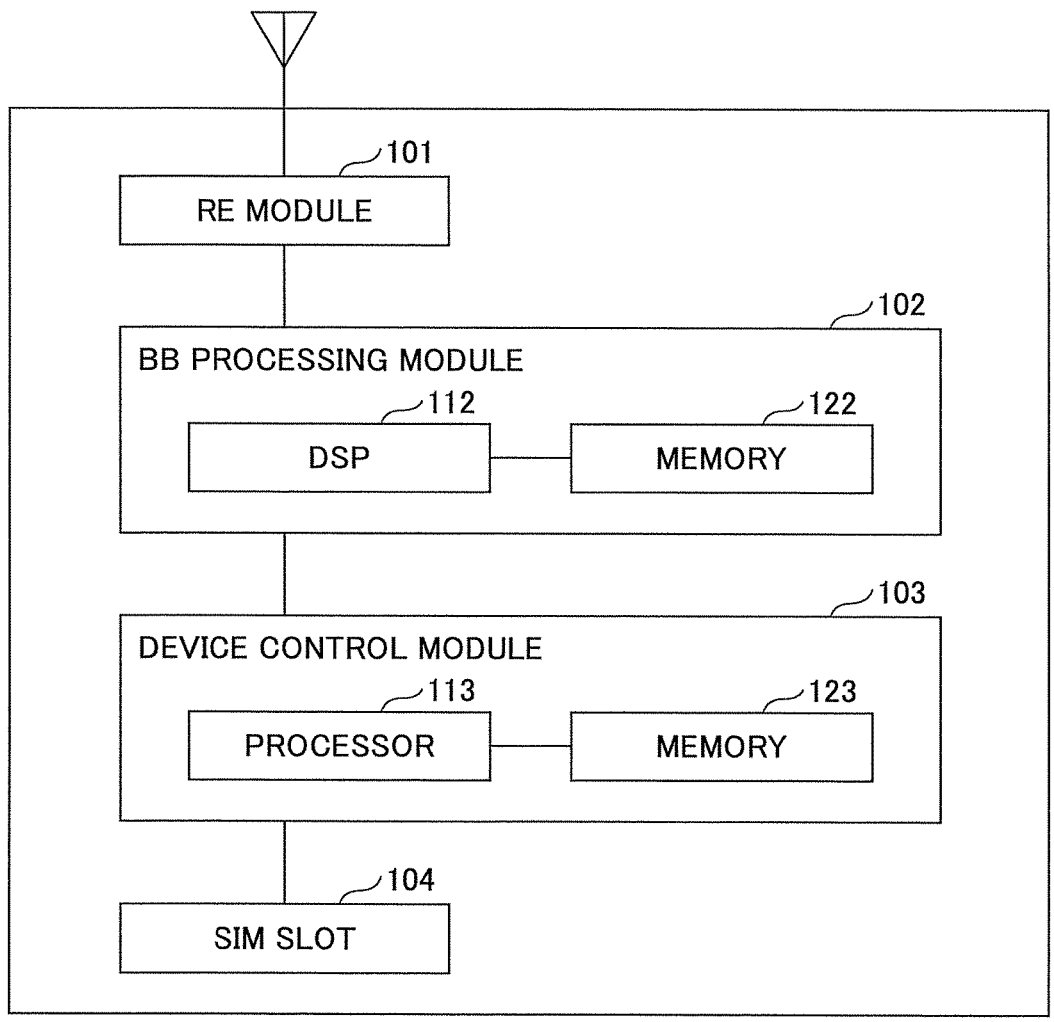

FIG.5B

[APN RESTRICTION INFORMATION]
APN_1: NO RESTRICTION
OTHER APN: xx% BARRED

USER DEVICE AND RESTRICTION METHOD

TECHNICAL FIELD

The present invention relates to a user device and a restriction method.

BACKGROUND ART

Radio communication systems conforming to 3rd Generation Partnership Project (3GPP) standards such as 3G and Long Term Evolution (LTE) include a mechanism (access control) that prevents multiple user devices from accessing a network at the same time to reduce the network load.

First, Access Class Barring (ACB) is an access control scheme that makes it possible to prevent access from user devices to a network at a specified probability by including a flag indicating prevention of access to the network or a barring rate in broadcast information for reporting various types of information from the network to the user devices. Using ACB makes it possible to restrict calls from user devices to a network. However, with ACB, except for, for example, an emergency call, it is not possible to control access according to the types of services (see, for example, Non-Patent Document 1).

Next, Service Specific Access Control (SSAC) makes it possible to report different barring rates for voice and video calls in an IP Multimedia core network Subsystem (IMS) to prevent voice and video calls at probabilities corresponding to the barring rates. SSAC makes it possible to restrict access to a network handling the IMS and to reduce the load of the network (see, for example, Non-Patent Document 1).

Next, Access Class for CSFB makes it possible to report a barring rate for calls according to a circuit switched fallback (CSFB) scheme, and thereby makes it possible to prevent calls according to the CSFB scheme at a probability corresponding to the barring rate. When a user device in an LTE network is to use a service such as a voice call provided by a circuit switched (CS) domain, CSFB enables the user device to transition from the LTE network not supporting the CS domain to a Universal Mobile Telecommunications System (UMTS) network or a Global System for Mobile Communications (GSM: registered trademark) network supporting the CS domain, and thereby enables the user device to make a voice call. Access Class for CSFB makes it possible to restrict access to a network supporting the CS domain and to reduce the load of the network (see, for example, Non-Patent Document 1).

Also, Application specific Congestion control for Data Communication (ACDC) is specified by 3GPP Release 13 (see, for example, Non-Patent Document 1). ACDC is an access control scheme that enables access control for each application installed in a user device. Independent of an access control scheme such as IMS or CSFB, ACDC makes it possible to allow communications performed by an application specified by broadcast information and to prevent communications performed by an application specified by broadcast information at a specified probability.

Specifically, according to ACDC, information called ACDC categories for categorizing specific applications is stored in a user device. The network reports barring rates associated with the ACDC categories to the user device via broadcast information. This makes it possible to restrict communications performed by specific applications or to allow only communications performed by specific applications.

RELATED-ART DOCUMENT

Non-Patent Document

[Non-Patent Document 1] 3GPP TS22.011 V13.1.0 (2014-09)

DISCLOSURE OF INVENTION

Problems to be Solved by the Invention

For example, during a disaster, allowing communications performed by a specific application intended to be used during the disaster and preventing communications performed by other general applications make it possible to improve the convenience of users and reduce the network load. Also, preventing communications performed by the other general applications during a disaster enables a telecommunications operator to secure a larger amount of network resources for communications performed by the specific application and for emergency calls.

Also, in terms of reducing the network load, an access control scheme that can prevent user devices from accessing a network is preferable to a control scheme that discards calls in a core network.

However, related-art access control schemes such as ACB, SSAC, and Access Class for CSFB cannot perform access control for each application installed in a user device.

On the other hand, ACDC can perform access control for each application. However, in the current ACDC, no method for identifying applications is defined by 3GPP standards.

One object of this disclosure is to solve or reduce the above-described problems, and to provide a technology for an access control that allows a specific application to perform communication.

Means for Solving the Problems

In an aspect of this disclosure, there is provided a user device that communicates with a network apparatus and in which at least one application is installed. The user device includes a receiver that receives, from the network apparatus, restriction information including a destination identifier for identifying an external network connected to the network apparatus and a barring rate associated with the destination identifier, and a controller that when communication is to be started by the application, controls whether to allow or prevent the communication by the application based on the restriction information.

Advantageous Effect of the Invention

An aspect of this disclosure makes it possible to provide a technology for an access control that allows a specific application to perform communications.

BRIEF DESCRIPTION OF THE DRAWINGS

FIG. 4 is a drawing illustrating an example of a hardware configuration of a user device according to an embodiment;

FIG. 5A is a table illustrating an example of connection status information;

FIG. 5B is a drawing illustrating an example of broadcast information;

DESCRIPTION OF EMBODIMENTS

Figure 1:
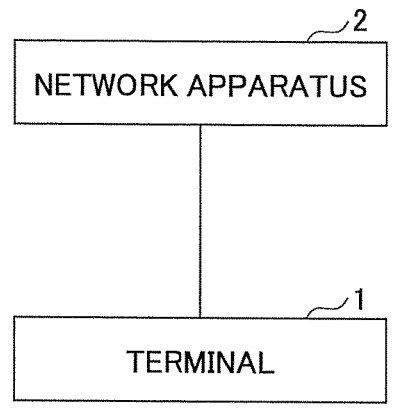
FIG. 1 is a drawing illustrating an overall configuration of a radio communication system according to an embodiment.

Embodiments of the present invention are described below with reference to the accompanying drawings. The same reference number is assigned to the same component in the drawings, and repeated descriptions of the component may be omitted. Embodiments described below are examples, and the present invention is not limited to those embodiments. For example, although it is assumed that a base station and a user device described below use GSM (registered trademark), 3G, or LTE radio technologies, the present invention may also be applied to a base station and a user device that use radio technologies other than GSM (registered trademark), 3G, and LTE radio technologies. In the descriptions below, "access control" is referred to as "restriction".

<Outline>

FIG. 1 is a drawing illustrating an overall configuration of a radio communication system according to an embodiment. The radio communication system of the present embodiment includes a user device 1 and a network apparatus 2. Although only one user device 1 is illustrated in FIG. 1, this is for illustration purposes only. That is, the radio communication system of the present embodiment may include multiple user devices 1.

An operating system (OS) and one or more applications are installed in the user device 1, and the user device 1 includes a function to wirelessly communicate with the network apparatus 2. The user device 1 is, for example, a cellphone, a smartphone, a tablet computer, a mobile router, or a wearable terminal. The user device 1 may be implemented by any device including a communication function. The user device 1 is comprised of hardware resources including a CPU such as a processor; a memory such as a ROM, a RAM, or a flash memory; and an antenna and a radio frequency (RF) device for communicating with a base station. Functions and processes of the user device 1 may be implemented by processing and executing data and programs stored in a memory by a processor. However, the hardware configuration of the user device 1 is not limited to that described above, and the user device 1 may have any other appropriate hardware configuration.

The network apparatus 2 is a mobile communication network provided by a mobile communication provider, and includes a radio network apparatus and a core network apparatus. Also, the network apparatus 2 includes a function to wirelessly communicate with the user device 1. The network apparatus 2 is connected to one or more packet data networks (PDN). Examples of PDNs include external networks such as a network of an Internet service provider and an intranet. That is, the network apparatus 2 functions as a tunnel that enables transmission and reception of data between applications installed in the user device 1 and the PDNs.

Here, an identifier for uniquely identifying a PDN in a mobile communication network is referred to as an access point name (APN). According to the LTE specification, the user device 1 operates on an assumption that the user device 1 is always connected to at least one PDN. An example of the APN of a PDN is a default APN.

To communicate with a specific PDN, the user device 1 reports the APN associated with the PDN to the network apparatus 2, and thereby requests the network apparatus 2 to establish a connection between the user device 1 and the PDN. According to the LTE specification, the user device 1 can establish connections with multiple PDNs.

Figure 2:
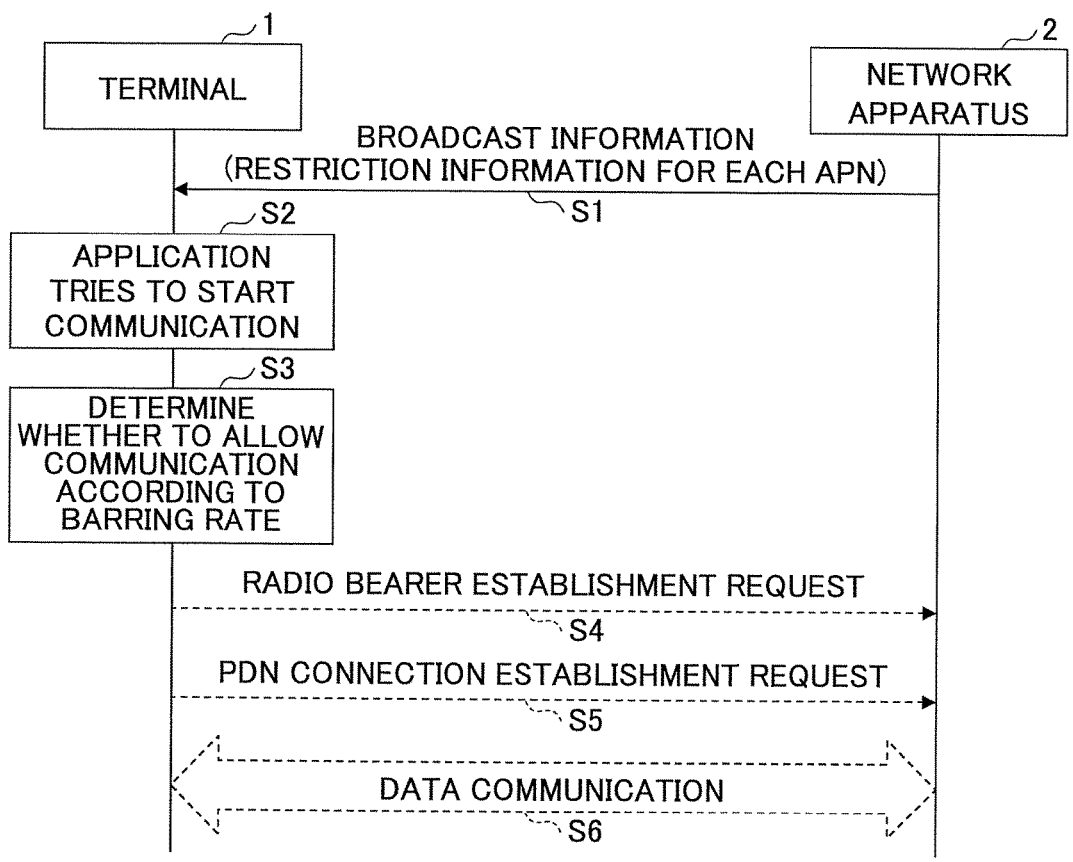
FIG. 2 is a sequence chart illustrating an outline of a process performed by a radio communication system according to an embodiment.

FIG. 2 is a sequence chart illustrating an outline of a process performed by the radio communication system of the present embodiment. A process where restriction is performed when an application installed in the user device 1 tries to start communications is described with reference to FIG. 2.

First, when a restriction start request is received from, for example, an administrator of a telecommunications operator, the network apparatus 2 wirelessly transmits broadcast information including restriction information for respective APNs (S1). In this state, an application installed in the user device 1 tries to start communication with a specific packet data network (PDN) (S2).

Next, the user device 1 detects the PDN with which the application is trying to start communication, and compares an APN associated with the detected PDN with APNs in the restriction information to determine whether the APN is a restriction target (S3). When the APN is a restriction target, the user device 1 does not allow the application to perform communication. On the other hand, when the APN is not a restriction target, the user device 1 transmits a radio bearer establishment request (S4) or a PDN connection establishment request (S5) to the network apparatus 2 as necessary to establish a connection with the PDN, and transmits data received from the application to the network device 2 (S6).

In the radio communication system of the present embodiment, at least a high-priority application (an application that is excluded from restriction targets as necessary) in one or more applications installed in the user device 1 is associated with a specific PDN (APN). Also, the user device 1 is configured to identify the APN of a PDN, with which an application is trying to start communication, based on a report from, for example, the OS. Further, the user device 1 is configured to recognize broadcast information including restriction information in which barring rates are specified for respective APNs. With the above configuration, the radio communication system of the present embodiment can apply different levels of restriction to respective applications.

<Functional Configuration>

Figure 3:
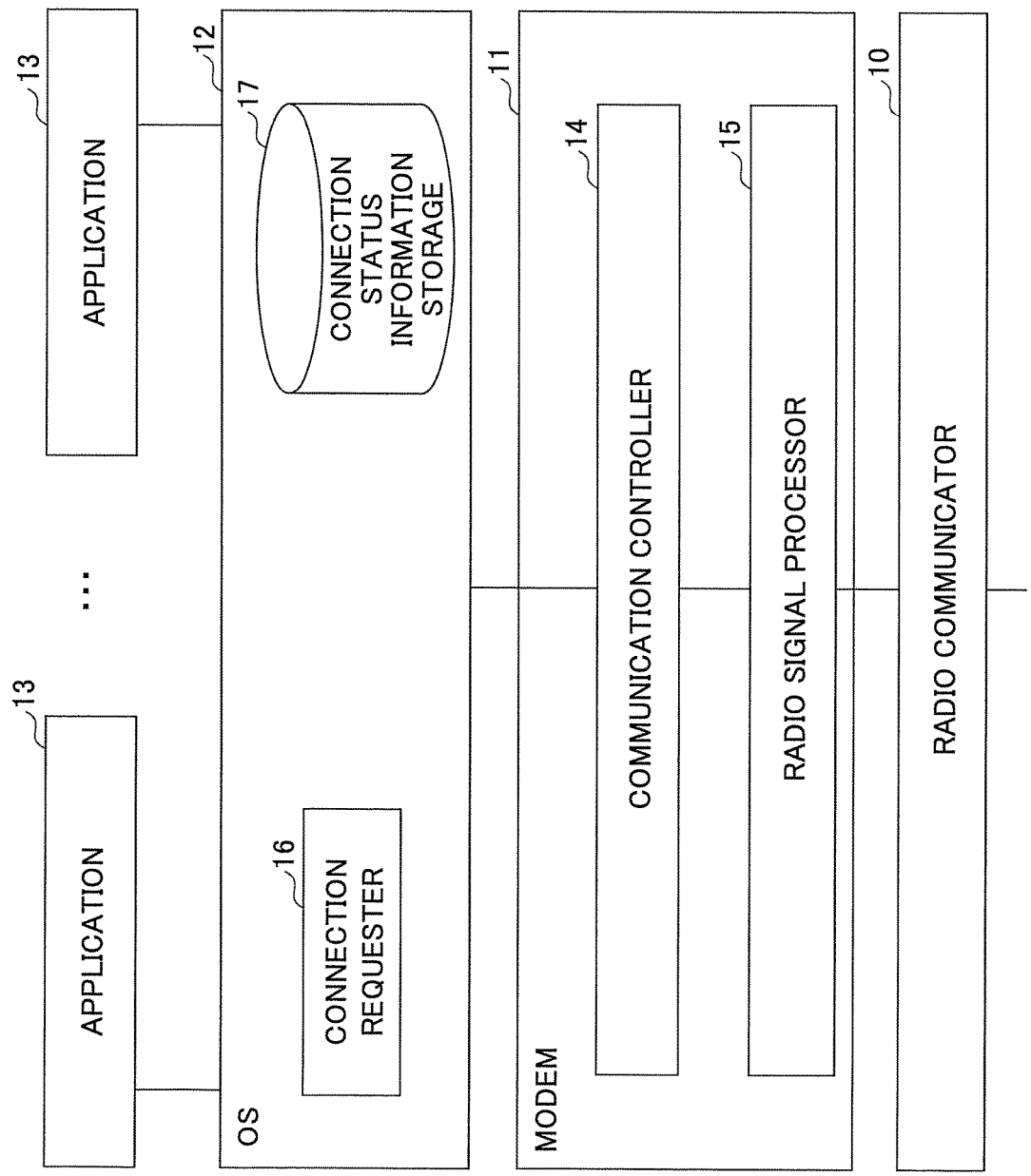
FIG. 3 is a drawing illustrating an example of a functional configuration of a user device according to an embodiment.

FIG. 3 is a drawing illustrating an example of a functional configuration of the user device 1 according to the present embodiment. The user device 1 of the present embodiment includes a radio communicator 10, a modem 11, an OS 12, and applications 13. The modem 11 includes a communication controller 14 and a radio signal processor 15. The OS 12 includes a connection requester 16 and a connection status information storage 17. FIG. 3 illustrates only functional components of the user device 1 that are particularly relevant to the present embodiment, and the user device 1 may also at least include unshown functional components that are necessary for operations conforming to GSM (registered trademark), 3G, or LTE. Also, the functional configuration of FIG. 3 is just an example. As long as operations related to the present embodiment can be performed, the categorization and the names of the functional components may be freely changed.

The radio communicator 10 transmits and receives radio signals to and from the network apparatus 2. The modem 11 performs a process of extracting data from a radio signal, a process of converting data into a radio signal, and a call control process. Also, the modem 11 performs signal processing in, for example, Layer 2 and Layer 1 (physical layer). The modem 11 may be configured to perform the signal processing in collaboration with the radio communicator 10.

The OS 12 is basic software of the user device 1. The OS 12, for example, controls hardware of the user device 1, provides basic graphical user interfaces (GUI) for a user, and provides an execution platform for the applications 13.

The applications 13 run on the OS 12 of the user device 1, and provide various functions to the user. The applications 13 may be applications preinstalled in the user device 1 or applications installed by the user as necessary. In the present embodiment, the applications 13 may include both types of applications. One or more applications 13 may be installed in the user device 1, and the number of applications 13 installable in the user device 1 is not limited.

The communication controller 14 controls whether to establish a connection with the network apparatus 2. More specifically, when a connection request signal (a signal indicating that an application is requesting to start communication) is received from the connection requester 16, the communication controller 14 controls whether to establish a connection with the network apparatus 2 based on restriction information sent from the radio signal processor 15.

Here, establishing a connection indicates establishing a communication bearer (e.g., an EPS bearer) with the network apparatus 2. The communication controller 14 relays signals transmitted and received between the application 13 and a PDN via the established communication bearer.

Also, when the bearer of a radio layer has been disconnected, the communication controller 14 controls whether to establish the bearer of the radio layer. To establish the bearer of the radio layer, the communication controller 14 requests the radio signal processor 15 to establish a radio bearer. The communication controller 14 may be, for example, a functional component for processing (or terminating) a network access stratum (NAS) protocol.

The radio signal processor 15 reads broadcast information included in a radio control channel transmitted from the network apparatus 2. When restriction information is included in the broadcast information, the radio signal processor 15 sends the read restriction information to the communication controller 14. Also, when the restriction information included in the broadcast information is changed, the radio signal processor 15 sends the changed restriction information to the communication controller 14. Also, according to a request from the communication controller 14, the radio communicator 10 establishes the bearer of the radio layer with the network apparatus 2. Also, when data communication is not performed for a predetermined period, the radio communicator 10 disconnects the bearer of the radio layer (i.e., causes the user device 1 to transition to a preservation state). The radio signal processor 15 may be, for example, a functional component that performs a radio resource control (RRC) process. The user device 1 may also transition to the preservation state when the bearer of the radio layer is disconnected according to a request from the network device 2.

When a request to start communication with a PDN is received from the application 13, the connection requester 16 sends a connection request signal to the communication controller 14. When a request to start communication with a PDN is received from the application 13, the connection requester 16 determines whether a connection has already been established with the PDN that the application 13 is attempting to communicate with, and based on the determination result, controls the type of a connection request signal (a radio bearer establishment request or a PDN connection establishment request) to be sent to the communication controller 14.

The connection requester 16 may be configured to manage the correspondence between the applications 13 and PDNs, or to receive the APN of a destination PDN directly from the application 13.

The connection status information storage 17 stores connection status information indicating a PDN(s) with which a connection is established by the user device 1.

<Hardware Configuration>

The entire functional configuration of the user device UE may be implemented by a hardware circuit(s) (e.g., one or more IC chips). Alternatively, a part of the functional configuration of the user device UE may be implemented by a hardware circuit(s) and the remaining part of the functional configuration of the user device UE may be implemented by a CPU and programs.

FIG. 4 is a drawing illustrating an example of a hardware configuration of the user device according to an embodiment. FIG. 4 illustrates a configuration that is closer than FIG. 3 to an actual implementation. As illustrated by FIG. 4, the user device UE includes a radio equipment (RE) module 101 that performs processes related to radio signals, a baseband (BB) processing module 102 that performs baseband signal processing, a device control module 103 that performs processes in upper layers, and a SIM slot 104 that is an interface for accessing a SIM card.

The RE module 101 performs processes such as digital-to-analog (D/A) conversion, modulation, frequency conversion, and power amplification on a digital baseband signal received from the BB processing module 102 to generate a radio signal to be transmitted from an antenna. Also, the RE module 101 performs processes such as frequency conversion, analog-to-digital (A/D) conversion, and modulation on a received radio signal to generate a digital baseband signal, and sends the digital baseband signal to the BB processing module 102. The RE module 101 may include, for example, a part of the radio communicator 10.

The BB processing module 102 converts an IP packet into a digital baseband signal and vice versa. A digital signal processor (DSP) 112 is a processor that performs signal processing in the BB processing module 102. A memory 122 is used as a work area of the DSP 112. The BB processing module 112 may include, for example, a part of the radio communicator 10, the modem 11, the communication controller 14, and the radio signal processor 15.

The device control module 103 performs protocol processing in the IP layer and processes related to applications. A processor 113 performs processes of the device control module 103. A memory 123 is used as a work area of the processor 113. The device control module 103 may include, for example, the OS 12 and the applications 13. The processor 113 also reads and writes data from and to a SIM via the SIM slot 104.

FIG. 5A illustrates an example of connection status information. The connection status information includes APNs and IP addresses that are associated with each other. In the example of FIG. 5A, connections are already established between the user device 1 and a PDN whose APN is "APN_1" and between the user device 1 and a PDN whose APN is "Default apn", and IP addresses "a.b.c.d" and "e.f.g.h" are provided by the PDNs for the user device 1.

FIG. 5B illustrates an example of broadcast information including restriction information. The exemplary restriction information of FIG. 5B indicates that a barring rate of xx % is applied to APNs other than APN_1. Here, a barring rate indicates a probability at which access is prevented. For example, a barring rate of 10% indicates that communication is prevented at a probability of one in ten. Also, a barring rate of 50% indicates that communication is prevented at a probability of one in two. Further, a barring rate of 80% indicates that communication is prevented at a probability of eight in ten.

<Processes>

Figure 6:
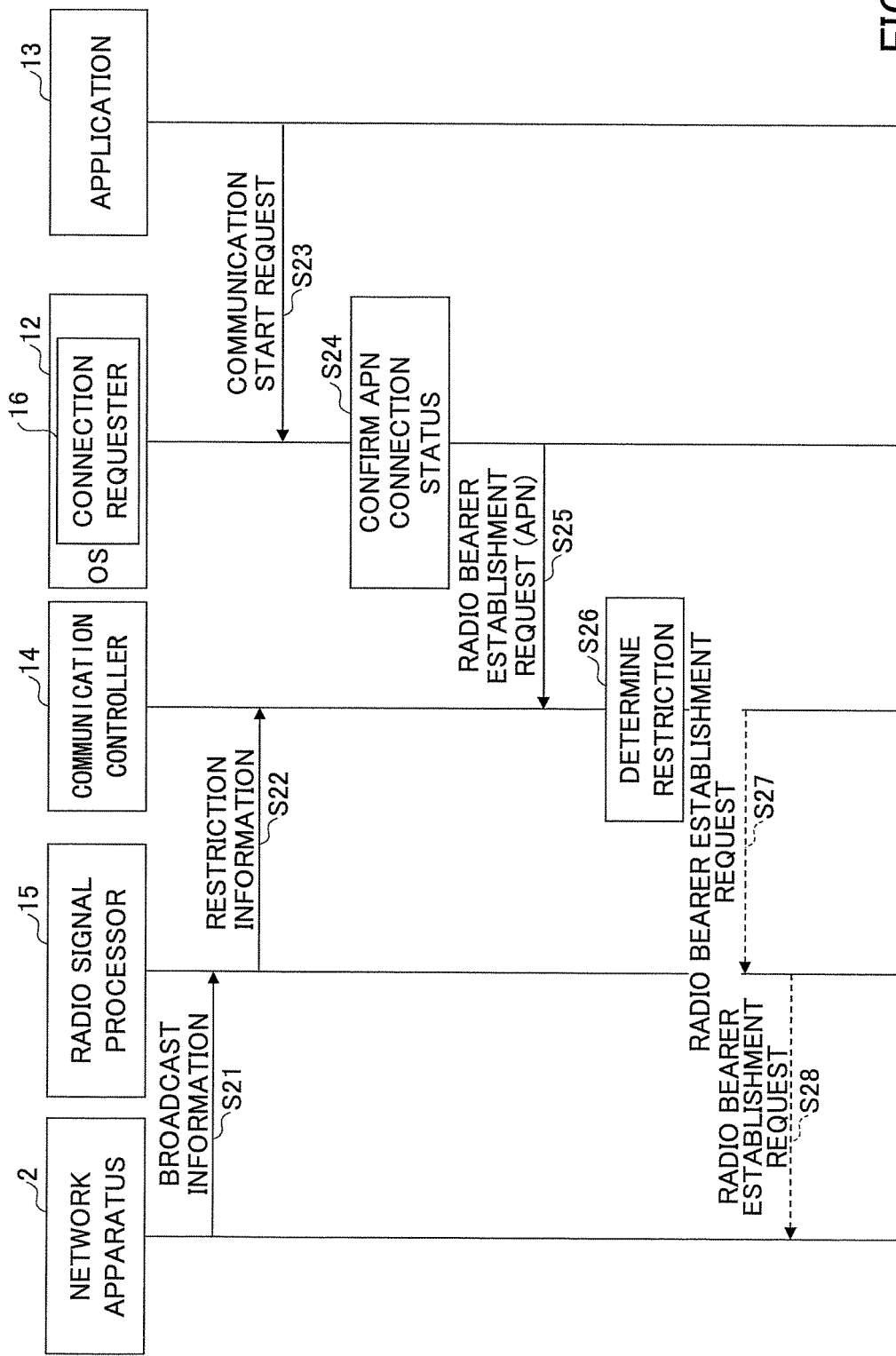
FIG. 6 is a sequence chart illustrating an example of a restriction process according to an embodiment.
Figure 7:
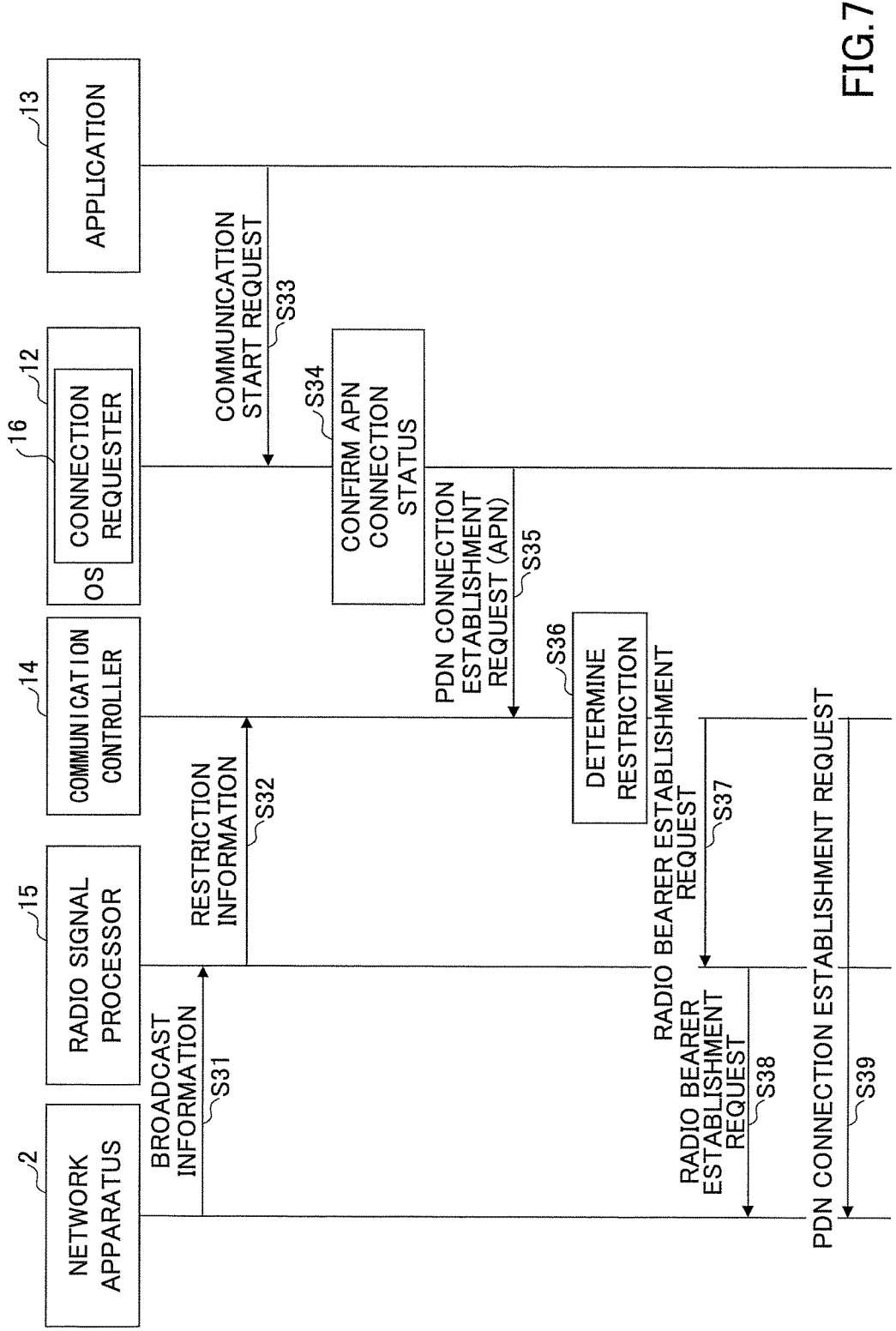
FIG. 7 is a sequence chart illustrating an example of a restriction process according to an embodiment.
Figure 8:
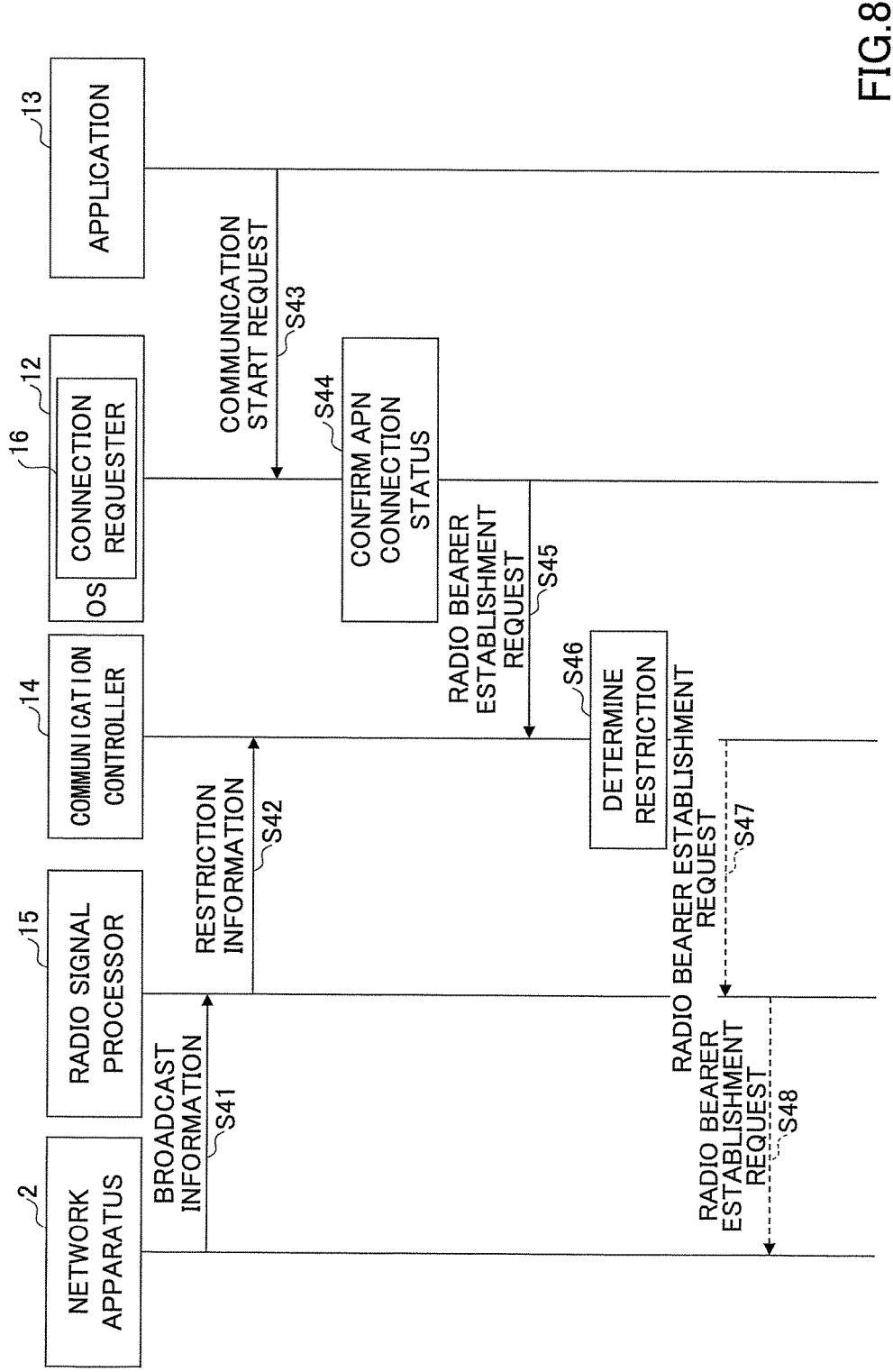
FIG. 8 is a sequence chart illustrating an example of a restriction process according to an embodiment.

FIGS. 6 through 8 are sequence charts illustrating examples of restriction processes according to an embodiment. As described above, in the radio communication system of the present embodiment, at least a high-priority application (an application that is excluded from restriction targets as necessary) in one or more applications installed in the user device 1 is associated with a specific PDN (APN).

FIGS. 6 and 7 illustrate restriction processes performed on an application 13 (which is assumed to be a high-priority application but may instead be a low-priority application) associated with a specific PDN (APN). On the other hand, FIG. 8 illustrates a restriction process performed on an application 13 (which is assumed to be a low-priority application) not associated with any specific PDN (APN).

<Restriction Process (1)>

A restriction process performed on an application 13 associated with a specific PDN (APN) is described with reference to FIG. 6. In the restriction process of FIG. 6, it is assumed that a connection has already been established between the user device 1 and the PDN that the application 13 is attempting to communicate with.

First, when broadcast information including restriction information is received from the network apparatus 2 (S21), the radio signal processor 15 extracts the restriction information from the broadcast information and sends the restriction information to the communication controller 14 (S22). The communication controller 14 stores the restriction information in, for example, a memory.

Next, the application 13 sends a communication start request to the connection requester 16 to request communication with the PDN (S23).

Next, the connection requester 16 identifies the APN of the PDN that the application 13 is attempting to communicate with and searches the connection status information for the identified APN to determine whether a connection has already been established with the PDN (S24). Here, the connection requester 16 may be configured to prestore information associating one or more applications 13 installed in the user device 1 with the APNs of PDNs that are communication targets of the one or more applications 13 and to identify, based on the prestored information, the APN of the PDN that the application 13 sending the communication start request at step S23 is attempting to communicate with. Also, the communication start request sent from the application 13 at step S23 may include an APN, and the connection requester 16 may be configured to identify the APN of the PDN that the application 13 is attempting to communicate with based on the APN included in the communication start request. In the example of FIG. 6, it is determined that a connection has already been established between the user device 1 and the PDN that the application 13 is attempting to communicate with.

Next, the connection requester 16 sends a radio bearer establishment request including the APN of the PDN that the application 13 is attempting to communicate with to the communication controller 14 (S25). Here, the radio bearer establishment request is a signal that is used when a connection has already been established with the PDN to request the communication controller 14 to establish a radio bearer. Because the connection requester 16 already knows the destination PDN, if APN-based restriction is not to be performed, it is not necessary to include the APN in the radio bearer establishment request. On the other hand, in the present invention, to achieve APN-based restriction, the APN of the destination PDN is reported to the communication controller 14 of the modem 11.

Next, the communication controller 14 compares the APN in the radio bearer establishment request with APNs in the restriction information received at step S22 to determine whether the APN in the radio bearer establishment request is a restriction target (S26). When the APN is not a restriction target and the radio bearer between the user device 1 and the network apparatus 2 is disconnected, the communication controller 14 transmits the radio bearer establishment request via the radio signal processor 15 to the network apparatus 2 (S27, S28).

On the other hand, when the APN is a restriction target, the communication controller 14 determines whether to prevent communication based on the barring rate included in the restriction information. For example, the communication controller 14 may be configured to generate a random number within a range of 1 to 100, to prevent communication when the generated random number is less than the barring rate, and to not prevent communication when the generated random number is greater than or equal to the barring rate.

When it is determined to not prevent communication and the radio bearer between the user device 1 and the network apparatus 2 is disconnected, the communication controller 14 transmits the radio bearer establishment request via the radio signal processor 15 to the network apparatus 2 (S27, S28).

When it is determined to prevent communication, the communication controller 14 terminates the process without transmitting the radio bearer establishment request to the network apparatus 2. Also, when it is determined to prevent communication, the communication controller 14 may disconnect the connection (EPS bearer) established between the user device 1 and the destination PDN to prevent the application 13 from communicating with the PDN.

Also, when it is determined to prevent communication, the communication controller 14 may report to the OS or the application 13 that communication is disallowed.

<Restriction Process (2)>

A restriction process performed on an application 13 associated with a specific PDN (APN) is described with reference to FIG. 7. In the process of FIG. 7, different from the process of FIG. 6, it is assumed that no connection is established between the user device 1 and the PDN that the application 13 is attempting to communicate with.

Steps S31 through S33 are substantially the same as steps S21 through S23 of FIG. 6, and therefore their descriptions are omitted here. Also, details of the process of FIG. 7 not mentioned below may be the same as those of FIG. 6.

After step S33, the connection requester 16 identifies the APN of the PDN that the application 13 is attempting to communicate with and searches the connection status information for the identified APN to determine whether a connection has already been established with the PDN (S34). In the example of FIG. 7, it is determined that no connection is established between the user device 1 and the PDN that the application 13 is attempting to communicate with.

Next, the connection requester 16 sends, to the communication controller 14, a PDN connection establishment request including the APN of the PDN that the application 13 sending the communication start request at step S33 is attempting to communicate with (S35). Here, the PDN connection establishment request is a signal that is used when no connection is established with the PDN to request the communication controller 14 to establish a radio bearer and a connection with the PDN.

Next, the communication controller 14 compares the APN in the PDN connection establishment request with APNs in the restriction information received at step S32 to determine whether the APN in the PDN connection establishment request is a restriction target (S36). When the APN is not a restriction target, the communication controller 14 transmits a radio bearer establishment request via the radio signal processor 15 to the network apparatus 2 (S37, S38). Also, after the radio bear is established, the communication controller 14 transmits the PDN connection establishment request to the network apparatus 2 (S39).

On the other hand, when the APN is a restriction target, the communication controller 14 determines whether to prevent communication based on the barring rate included in the restriction information.

When it is determined to not prevent communication, the communication controller 14 transmits the radio bearer establishment request via the radio signal processor 15 to the network apparatus 2 (S37, S38). Also, the communication controller 14 transmits the PDN connection establishment request to the network apparatus 2 (S39).

When it is determined to prevent communication, the communication controller 14 terminates the process without transmitting the radio bearer establishment request and the PDN connection establishment request to the network apparatus 2.

Also, when it is determined to prevent communication, the communication controller 14 may report to the OS or the application 13 that communication is disallowed.

<Restriction Process (3)>

A restriction process performed on an application 13 that is not associated with any specific PDN (APN) is described with reference to FIG. 8. In the example of FIG. 8, it is assumed that the application 13 is, for example, a low-priority application.

As described above, according to the LTE specification, the user device 1 operates on an assumption that the user device 1 is always connected to at least one PDN (i.e., a connection is always established). An example of the APN of such a PDN is Default APN. Accordingly, in the example of FIG. 8, the application 13 may communicate with a PDN corresponding to Default APN. Also, when a connection has already been established with another PDN (APN), the application 13 in the example of FIG. 8 may communicate with the other PDN (APN). Details of the process of FIG. 8 not mentioned below may be the same as those of FIG. 6.

Steps S41 through S43 are substantially the same as steps S21 through S23 of FIG. 6, and therefore their descriptions are omitted here.

After step S43, the connection requester 16 tries to identify the APN of a PDN that the application 13 is attempting to communicate with (S44). In the example of FIG. 8, the application 13 is not associated with any specific PDN (APN), and a connection has already been established with a PDN. Therefore, the connection requester 16 determines that a connection has already been established with a PDN that the application 13 is attempting to communicate with, and proceeds to step S45.

Next, the connection requester 16 sends a radio bearer establishment request to the communication controller 14 (S45). Here, the connection requester 16 has determined at step S44 that a connection has already been established with the PDN that the application 13 is attempting to communicate with. In this case, because it is not necessary to transmit a PDN connection establishment request from the communication controller 14 to the network apparatus 2, the connection requester 16 does not include any APN in the radio bearer establishment request to be sent to the communication controller 14. Here, at step S25 of FIG. 6, the connection requester 16 includes an APN in the radio bearer establishment request even though there is no need to transmit the PDN connection establishment request. When the connection requester 16 does not include any APN in the radio bearer establishment request, the process after step S25 may become similar to the process of FIG. 8.

Next, because no APN is included in the radio bearer establishment request, the communication controller 14 determines whether at least one restriction-target APN is included in the restriction information received at step S42, and thereby determines whether to prevent communication (S46). When no APN is included in the restriction information received at step S42 and the radio bearer between the user device 1 and the network apparatus 2 is disconnected, the communication controller 14 transmits the radio bearer establishment request via the radio signal processor 15 to the network apparatus 2 (S47, S48).

On the other hand, when at least one APN is included in the restriction information received at step S42, the communication controller 14 determines whether to prevent communication based on a barring rate included in the restriction information.

When it is determined to not prevent communication and the radio bearer between the user device 1 and the network apparatus 2 is disconnected, the communication controller 14 transmits the radio bearer establishment request via the radio signal processor 15 to the network apparatus 2 (S47, S48).

When it is determined to prevent communication, the communication controller 14 terminates the process without transmitting the radio bearer establishment request to the network apparatus 2. Also, when it is determined to prevent communication, the communication controller 14 may disconnect the connection (EPS bearer) established between the user device 1 and the PDN to prevent the application 13 from communicating with the PDN.

Also, when it is determined to prevent communication, the communication controller 14 may report to the OS or the application 13 that communication is disallowed.

In the restriction process (1) described above, when a connection has already been established with a PDN and the user device 1 is in the preservation state, an APN is set in the radio bearer establishment request to be sent from the connection requester 16 to the communication controller 14 (S25) in order to achieve APN-based restriction. With the related-art technologies, however, it is not possible to set an APN in the radio bearer establishment request to be sent from the connection requester 16 to the communication controller 14. Accordingly, if the related-art technologies are used without any change, the restriction process (3) (where the user device 1 is connected to an APN for a low-priority application) is performed even when an application tries to connect to a high-priority APN (an APN to which a high-priority application is connected).

To prevent this problem, the user device 1 and the network apparatus 2 may be configured such that a connection with a PDN is disconnected when no data communication is being performed and a connection with a PDN is established only when data is generated, and the communication system of the present invention may be configured such that the restriction process (2) is performed when the user device 1 tries to connect to a high-priority APN. With this configuration, the PDN connection establishment request is sent from the connection requester 16 to the communication controller 14, and it becomes possible to perform a restriction process.

Restriction processes performed by the wireless communication system of the embodiment are described above. The radio bearer establishment request sent to the network apparatus 2 may be, for example, an Attach Request, an RRC Connection Request, or a Service Request. Also, for example, the PDN connection establishment request sent to the network apparatus 2 may be included in an Attach Request, or may be a PDN Connectivity Request.

EXAMPLES OF RESTRICTION PROCESSES

In the radio communication system of the present embodiment, the processes of FIGS. 6 through 8 may be combined to implement various restriction processes.

In the descriptions below, it is assumed that a high-priority application 13 ("application A") and a low-priority application 13 ("application B") are installed in the user device 1. Also, it is assumed that the application A communicates with a PDN corresponding to APN_1. Also, it is assumed that the application B communicates with a PDN corresponding to APN_2. Further, it is assumed that broadcast information includes restriction information illustrated by FIG. 5B.

Example 1

For example, it is assumed that a high-priority application 13 ("application A") and a low-priority application 13 ("application B") are installed in the user device 1. Also, it is assumed that the application A communicates with a PDN corresponding to APN_1. Also, it is assumed that the application B communicates with a PDN corresponding to APN_2. Further, it is assumed that broadcast information includes restriction information illustrated by FIG. 5B.

When a connection (e.g., always-on connection) is established between the user device 1 and each of the PDN corresponding to APN_1 and the PDN corresponding to APN_2, the process of FIG. 6 makes it possible to exclude only the application A from restriction targets to which restriction is applied.

Also, when no connection is established between the user device 1 and each of the PDN corresponding to APN_1 and the PDN corresponding to APN_2, the process of FIG. 7 makes it possible to exclude only the application A from restriction targets to which restriction is applied.

Also, when a connection is established between the user device 1 and the PDN corresponding to APN_1 and no connection is established between the user device 1 and the PDN corresponding to APN_2, the process of FIG. 6 may be applied to the application A and the process of FIG. 7 may be applied to the application B. This makes it possible to exclude only the application A from restriction targets to which restriction is applied.

Example 2

For example, it is assumed that a high-priority application 13 ("application A"), a low-priority application 13 ("application B"), and a low-priority application 13 ("application C") are installed in the user device 1. Also, it is assumed that the application A communicates with a PDN corresponding to APN_1. Also, it is assumed that the application B communicates with a PDN corresponding to APN_2. Also, it is assumed that the application C communicates with a PDN corresponding to Default APN. Further, it is assumed that broadcast information includes restriction information illustrated by FIG. 5B.

When the user device 1 is always connected (connection is always established) with the PDN corresponding to Default APN, and is connected as needed (connection is not established until communication is performed) with the PDNs corresponding to APN_1 and APN_2, the process of FIG. 7 may be applied to the application A, the process of FIG. 7 may be applied to the application B, and the process of FIG. 8 may be applied to the application C. This makes it possible to exclude only the application A from restriction targets to which restriction is applied.

<Effects>

As described above, in the radio communication system of the present embodiment, a high-priority application (an application that is excluded from restriction targets as necessary) in one or more applications installed in the user device 1 is associated with a specific PDN (APN). Also, when an application tries to start communication, the communication controller 14 of the user device 1 receives, from the connection requester 16, the APN of a PDN that the application is attempting to communicate with, and can recognize restriction information including barring rates for respective APNs. With this configuration, the radio communication system of the present embodiment can apply different levels of restriction to respective applications.

Also, the radio communication system of the present embodiment makes it possible to allow a specific application such as an application to be used during a disaster to perform communication and to prevent other applications from performing communication. This in turn makes it possible to improve the convenience of users while reducing the network load. Further, the radio communication system of the present embodiment can even prevent a specific application from accessing a network depending on the status of the network to secure a larger amount of network resources for emergency calls.

Supplementary Description of Embodiments

Embodiments of the present invention are described above. However, the present invention is not limited to the above-described embodiments, and a person skilled in the art may understand that variations, modifications, and replacements may be made to the above embodiments. Although specific values are used in the above descriptions to facilitate the understanding of the present invention, the values are just examples and other appropriate values may also be used unless otherwise mentioned. Grouping of subject matter in the above descriptions is not essential for the present invention. For example, subject matter described in two or more sections may be combined as necessary, and subject matter described in one section may be applied to subject matter described in another section unless they contradict with each other. Boundaries of functional units or processing units in functional block diagrams do not necessarily correspond to boundaries of physical components. Operations of multiple functional units may be performed by one physical component, and an operation of one functional unit may be performed by multiple physical components. Although a functional block diagram is used to describe a user device, the user device may be implemented by hardware, software, or a combination of them. Software to be executed by a processor of a user device according to the embodiment of the present invention may be stored in any appropriate storage medium such as a random access memory (RAM), a flash memory, a read only memory (ROM), an EPROM, an EEPROM, a register, a hard disk drive (HDD), a removable disk, a CD-ROM, a database, or a server. The present invention is not limited to the specifically disclosed embodiments, and variations and modifications may be made without departing from the scope of the present invention.

In the above embodiments, a combination of the radio communicator 10 and the radio signal processor 15 is an example of a receiver. The communication controller 14 is an example of a controller. The connection requester 16 is an example of a connection requester. An APN is an example of a destination identifier.

The present application is based on and claims the benefit of priority of Japanese Patent Application No. 2015-077195 filed on Apr. 3, 2015, the entire contents of which are hereby incorporated herein by reference.

EXPLANATION OF REFERENCE NUMERALS

1 User device
2 Network apparatus
10 Radio communicator
11 Modem
12 OS
13 Application
14 Communication controller
15 Radio signal processor
16 Connection requester
17 Connection status information storage
101 RE module
102 BB processing module
103 Device control module
104 SIM slot
112 DSP
113 Processor
122, 123 Memory

The invention claimed is:

1. A user device comprising:
a memory that stores an application that communicates with an external network connected to a network apparatus;
a receiver that receives, from the network apparatus, restriction information including a first destination identifier that identifies the external network and a barring rate associated with the first destination identifier;
a controller; and
a connection requester that sends a connection request signal to the controller in response to receiving a report to start communication from the application;
wherein the controller that detects that the communication is to be started by the application and determines whether to allow or prevent the communication by the application based on the restriction information.

2. The user device as claimed in claim 1, wherein
the connection request signal includes a second destination identifier that identifies an external network with which the application is to start the communication; and
the controller compares the second destination identifier with the first destination identifier to control whether to allow or prevent the communication by the application.

3. The user device as claimed in claim 2, wherein the connection request signal is a signal that requests establishment of a radio layer connection between the user device and the network apparatus.

4. The user device as claimed in claim 2,
wherein the connection requester identifies the first destination identifier, based on one of information for managing the first destination identifier and a report from the application.

5. The user device as claimed in claim 1,
wherein the connection requester identifies the first destination identifier, based on one of information for managing the first destination identifier and a report from the application.

6. The user device as claimed in claim 1, wherein the connection request signal is a signal that requests establishment of a radio layer connection between the user device and the network apparatus.

7. The user device as claimed in claim 6,
wherein the connection requester identifies the first destination identifier, based on one of information for managing the first destination identifier application.

8. A restriction method performed by a user device, the restriction method comprising:
storing, with the user device, an application that communicates with an external network connected to a network apparatus;
receiving, from the network apparatus, restriction information including a destination identifier that identifies the external network and a barring rate associated with the destination identifier; and
detecting communication is to be started by the application based on a connection request signal in response to a report to start communication from the application; and
determining whether to allow or prevent the communication by the application based on the restriction information.

* * * * *